Feb. 1, 1927. 1,616,155
C. UEBELMESSER
TIRE CARRYING MEANS FOR AUTOMOBILES, ETC
Filed Feb. 10, 1926 2 Sheets-Sheet 1
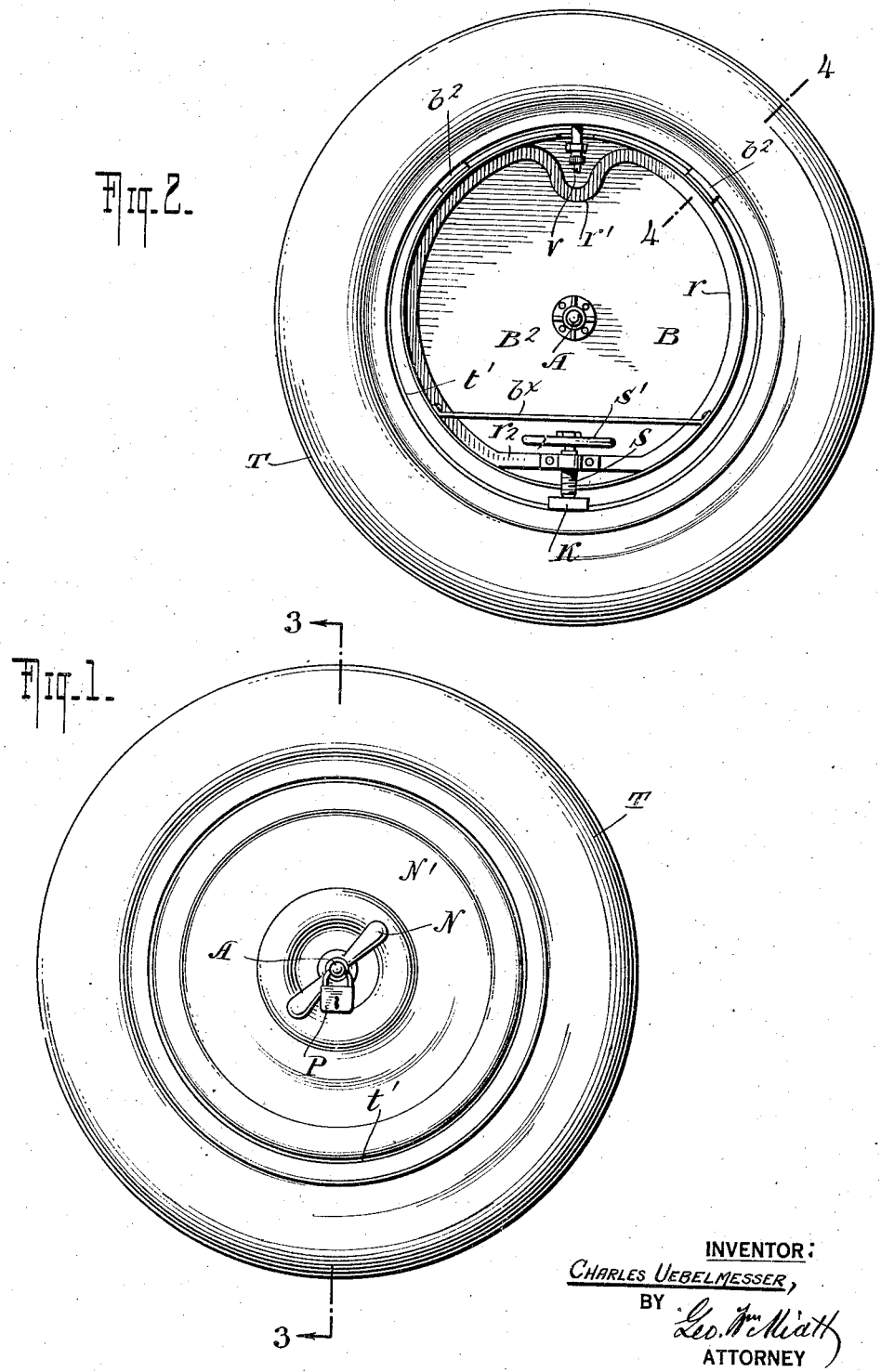
INVENTOR:
CHARLES UEBELMESSER,
BY
ATTORNEY

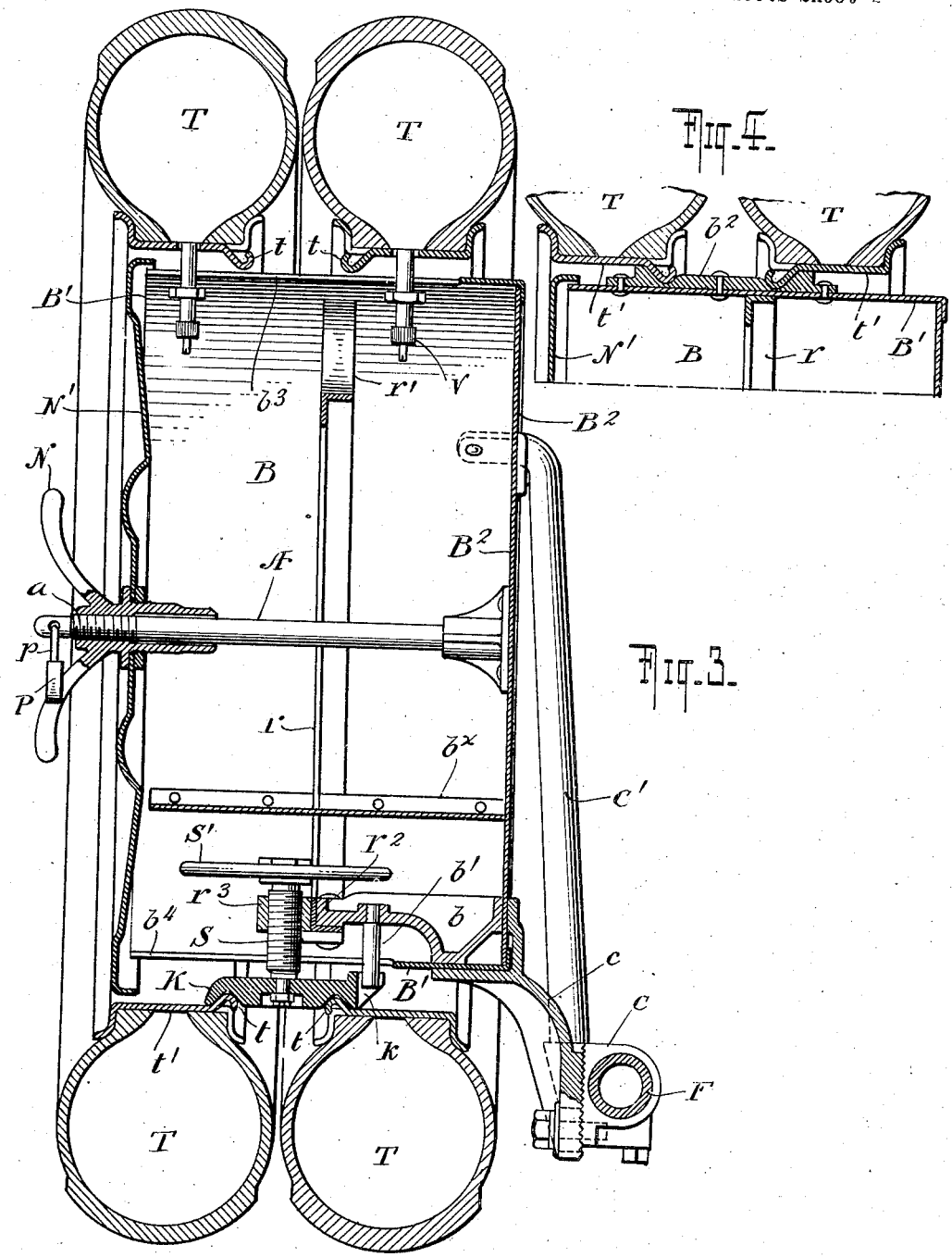

Patented Feb. 1, 1927.

1,616,155

UNITED STATES PATENT OFFICE.

CHARLES UEBELMESSER, OF NEW YORK, N. Y.

TIRE-CARRYING MEANS FOR AUTOMOBILES, ETC.

Application filed February 10, 1926. Serial No. 87,304.

My improvements relate to devices for supporting and securing reserve tires, as, for instance, at the rear of automobiles; and are designed to afford simple but effective means whereby such reserve tires may be conveniently and detachably but firmly held in requisite position, and whereby the circular medial area bounded by the tire rims may be utilized, not only to accommodate and enclose the tire clamping means but may also be adapted for use as a tool box or container for accessories,—the invention consisting in the specific construction, combination, and arrangement of parts described and claimed whereby these and other advantageous results are attained, all as hereinafter fully set forth.

In the accompanying drawings I illustrate a practical embodiment of the essential features of my invention as embodied in a tire supporting device of the character designated rigidly mounted on the rear cross bar of a chassis frame, although I do not limit myself to the identical form and construction of component parts shown by way of exemplification, since changes may be made in minor details, and equivalent mechanical expedients resorted to, with like results, and without departing from the spirit and intent of my invention in this respect.

With this understanding:—

Fig. 1, represents a rear view of my reserve tire support;

Fig. 2, a similar view with the cover plate removed;

Fig. 3, a central vertical section, on a larger scale and taken upon general plane of line 3—3, Fig. 1;

Fig. 4, a sectional detail taken upon plane of line 4—4, Fig. 2, but upon the same scale as Fig. 3.

In Fig. 3 I have shown my combined tire carrier and tool box as rigidly attached by clamping means C, to the rear cross bar or member F, of a chassis frame,—said clamping means C, being provided with rigid bracket arms $c$, $c'$, to which the box B, is, in turn, rigidly secured. Said box B, consists of a cylindrical shell B', and a back plate B², integral therewith. Rigidly mounted on the back plate B², in approximately axial relationship to the cylindrical shell B', of the box B, is a cover post A, the outer extremity of which is screw-threaded, as at $a$, for engagement with a hand nut N, by means of which latter the box-cover plate N', may be secured in closed relationship to the otherwise open edge of the cylindrical shell B'.—said hand nut N, and cover plate N', being permanently united. The outer end of the post A, beyond the screw thread $a$, is perforated for the reception of the hasp $p$, of a padlock P, by means of which the cover plate N', may be positively secured in position.

Coincident with the medial exterior clamp bracket $c$, is an interior bracket $b$, rigidly secured to the back plate B² and shell B', of the box B, and on this interior bracket $b$, is rigidly mounted a substantially concentric reinforcing rib $r$, the major portion of which contacts peripherally with the opposed inner surface of the cylindrical shell B', the upper portion of said reinforcing rib $r$, being formed with an offset or depression $r'$, for the accommodation of the tire air valves $v$, as will be understood by reference more particularly to Figs. 2 and 3, of the drawings, and the lower portion $r^2$, of said reinforcing rib $r$, forming a cross bar on which is mounted a stationary nut $r^3$, for engagement with a clamp screw $s$, the upper end of which is provided with a manipulative handle $s'$, and the lower end of which is pivotally connected with a tire clamping plate K, the under side of which is grooved as indicated in Fig. 3, of the drawings, so as to overlap and bear against the lower inturned portions $t$, of the metallic rims $t'$, of the pneumatic tires T, and thereby secure said tires T, in position on the box B, in conjunction with the grooved bearing blocks $b^2$, $b^2$, upon the upper portion of the latter, as will be understood by reference more particularly to Fig. 4, of the drawings.

$b'$, is a guide pin on the interior bracket $b$, which, by its protrusion into a slot $k$, formed for the purpose in the tire clamping plate K, maintains the alignment thereof as related to the clamp screw $s$, and thereby insures proper engagement with the tire rims.

The cylindrical shell B', of the box B, is formed with an upper slot $b^3$, for the accommodation of the air valves $v$, of the tires T, and also with a lower slot $b^4$, for the accommodation of the clamp screw $s$, and guide pin $b'$.

The sheet metal cover plate N' is preferably die-embossed to simulate, in conjunction with the adjacent tire on the box B, the symmetrical appearance of a disc wheel,—the said cover plate N', thus acting not only as an effective closure for the box, but also concealing the contents and functions thereof in other respects.

One or more partition shelves $b^x$, may be positioned in the box B, for the support of tools and accessories, and the interior of the box otherwise utilized as may be found most expedient in adapting it to the various requirements of use.

By reference more particularly to Figs. 3 and 4, of the drawings it will be understood that my construction and arrangement of parts is especially adapted to the accommodation and support of twin pneumatic tires T, T, reversed as related to each other in such manner that the inturned portions $t$, of their metallic rims $t'$, are positioned centrally and adjacent to each other, so that the grooved upper bearing blocks $b^2$, as well as the lower clamping block K, are common to both tires, and the clamping screw $s$, functions simultaneously for both tires,—the clamping block K, being held in alignment by the guide pin $b'$, extending into the slot $k$, in said clamping plate K, as clearly shown in Fig. 3. This feature is new in the art, and conducive of simplicity both of construction and convenience of manipulation of parts. In other words my device may be designated as plural or twin reserve tire carrying means.

What I claim as my invention and desire to secure by Letters Patent, is:—

Reserve plural tire supporting means of the character designated, comprising bearing blocks each grooved for the accommodation of adjacent inturned portions of the rims of two tires, a lower clamping plate also grooved for the accommodation of adjacent inturned portions of the rims of said two tires, and a manipulative screw on which said clamping plate is mounted, a bearing bracket for said screw, together with means carried by said bracket and cooperating with said plate for maintaining the alignment of said clamping plate, substantially in the manner and for the purpose set forth.

CHARLES UEBELMESSER.